(12) United States Patent
Wang

(10) Patent No.: US 11,279,537 B2
(45) Date of Patent: Mar. 22, 2022

(54) REUSABLE CABLE BUCKLE ASSEMBLY

(71) Applicant: Jiangsu Enman Electronic Industry Co., Ltd., Kunshan (CN)

(72) Inventor: Chuanbao Wang, Huainan (CN)

(73) Assignee: JIANGSU ENMAN ELECTRONIC INDUSTRY CO., LTD., Kunshan (CN)

( * ) Notice: Subject to any disclaimer, the term of this patent is extended or adjusted under 35 U.S.C. 154(b) by 0 days.

(21) Appl. No.: 17/096,188

(22) Filed: Nov. 12, 2020

(65) Prior Publication Data

US 2022/0017275 A1    Jan. 20, 2022

(30) Foreign Application Priority Data

Jul. 17, 2020 (CN) .......................... 202010693412.3

(51) Int. Cl.
  *B65D 63/10* (2006.01)
(52) U.S. Cl.
  CPC ................................ *B65D 63/1027* (2013.01)
(58) Field of Classification Search
  CPC ............ B65D 63/1027; Y10T 24/1404; Y10T 24/1406; Y10T 24/141; Y10T 24/1498; Y10T 24/153
  See application file for complete search history.

(56) References Cited

U.S. PATENT DOCUMENTS

| | | | | |
|---|---|---|---|---|
| 5,729,872 A | * | 3/1998 | Ginocchio | F16L 3/23 24/16 R |
| 7,500,643 B2 | * | 3/2009 | Leone | F16L 3/10 248/56 |
| 8,635,750 B1 | * | 1/2014 | Ginocchio | H02G 3/32 24/484 |
| 9,004,545 B2 | * | 4/2015 | Whitaker | A61M 39/1011 285/419 |
| 10,859,192 B2 | * | 12/2020 | Whitaker | F16L 25/06 |

* cited by examiner

*Primary Examiner* — Robert Sandy
(74) *Attorney, Agent, or Firm* — Muncy, Geissler, Olds & Lowe, P.C.

(57) ABSTRACT

A reusable cable buckle assembly includes a detachable connection cable buckle and a base, a bundle space is provided between the cable buckle and the base for bundle the cables. The cable buckle is a fixed type cable buckle or a movable type cable buckle. And the base is a fixed type base or a movable type base. The reusable cable buckle assembly realizes the opening or closing of the bundle space through the detachable connection of the cable buckle and the base, thereby realizes the reusable of the cable buckle, and greatly reducing the construction time and cost.

11 Claims, 17 Drawing Sheets

REUSABLE CABLE BUCKLE ASSEMBLY

TECHNICAL FIELD

The invention relates to a cable buckle device, especially related to a reusable cable tie assembly.

BACKGROUND TECHNOLOGY

In the power system, network cabling is the physical channel through which network devices (such as routers, switches and other communication equipment) and servers are connected to each other, and is the key infrastructure of the network system.

When the cables of the network device are not bundled and fixed, it not only affects the appearance of the wiring, but also easily causes inconvenience in maintenance or arrangement, and easily causes cable failure.

Therefore, in order to achieve unified routing, cable ties are often used to organize and fix the cables.

The most common cable tie generally comprising a ribbon-shaped binding part and a fixed end. A row of ratchet teeth is provided on the ribbon-shaped binding part, and the fixed end is provided with inverted teeth matching the ratchet teeth, When binding the cable, the above-mentioned ribbon-shaped binding part is passed through the fixed end, and the ratchet tooth and inverted tooth are matched to prevent the ribbon-shaped binding part from exiting the fixed end, thereby achieving the purpose of binding. However, the cable tie of this structure cannot be removed once it is buckled. If the cable needs to be re-wired or replaced, the cable tie can only be cut and replaced with a new cable tie, which is costly.

CONTENT OF INVENTION

In order to overcome the above-mentioned shortcomings, the object of the present invention is to provide a reusable cable buckle, the reuse function is realized by improving the structure of the cable buckle, and the construction time and cost are greatly reduced.

In order to achieve the above object, the technical solution adopted by the present invention is: a reusable cable buckle assembly, comprising a detachable connection cable buckle and a base, a bundle space is provided between the cable buckle and the base for bundle the cables. The cable buckle is a fixed type cable buckle or a movable type cable buckle. And the base is a fixed type base or a movable type base.

The good effects of the present invention are: Through the detachable connection of the cable buckle and the base, the bundle space can be opened or closed, which is convenient for the rewiring or replacing of cables. The cable buckle and the base be repeat use, which can greatly reduce construction time and cost; The flexibility of cable buckle and base connection is improve by fixed or movable cable buckles and fixed or movable bases, and its application scope is expanded.

Further, the fixed type cable buckle comprising the first arc-shaped buckle body, one end of the first arc-shaped buckle body is provided with a first connecting buckle that can rotate along the base, and the other end is provided with a side wall first tooth-shaped buckle that can be fastened to the base.

Further, the first tooth-shaped buckle is provided with a first Limited protruding teeth close to one end of connecting buckle, an arc surface is provided between the first limited protruding teeth and tooth-shaped buckle.

The most tightly buckled position of the first tooth-shaped buckle is defined by the setting of the first limited protruding teeth, and the setting of the arc surface facilitates the separation of the first tooth-shaped buckle and the base.

Further, the first arc-shaped buckle body is provided with special-shaped return force hole along the length direction of the first tooth-shaped buckle, and the width of the special-shaped return force hole gradually decreases from the direction closer to the arc surface away from the arc surface.

In actual use, in the process of buckling the first tooth buckle down to the base, as the first tooth-shaped buckle is buckled down, the more resistance the first tooth-shaped buckle is at the buckling position, the greater the buckling force required, and it is easy to disengage due to the reaction force after buckling, resulting in a change of buckling position. Therefore, the setting of the special-shaped return force hole can use the elastic force of the plastic material to provide a certain squeezing space for the buckle of the first tooth-shaped buckle, reduce the buckling force required when the first tooth-shaped buckle is buckled down, and it also avoids the disengage phenomenon of the first tooth-shaped buckle after buckling.

Further, the first connecting buckle comprising a semicircular buckle, and both ends of the buckle extend outward to form a clamping portion. The rotation of the first connection buckle is realized by the semicircular buckle, and the clamping portion prevent the buckle from slipping off the base during the rotation process.

Further, the side wall of the first arc-shaped buckle body is provided with a toggle part between the first Limited protruding teeth and the first connecting buckle, and to adjust the buckle position of first tooth-shaped buckle by setting the toggle part.

Further, the movable cable buckle includes a second arc-shaped buckle body. One end of the second arc-shaped buckle body is provided with a second connecting buckle that can rotate along the base, and the other end is provided with an integrally connected with a bending structure shielded sheet; the outer side wall of the shielded sheet is provided with a second tooth-shaped buckle that can be fastened to the base.

Further, the end of the second tooth-shaped buckle away from the second arc-shaped buckle body is sequentially provided with the second limited protruding tooth and an unlocking pressing part, which is used to separate the second tooth-shaped buckle from the base; The side wall of the second arc-shaped buckle body is also provided with a second toggle part which is convenient for adjusting the position of the second tooth-shaped buckle and the base.

Further, The fixed base comprising a first base plate, and the first base plate is provided with the first arc-shaped cable holder matching the first arc-shaped buckle body or the second arc-shaped buckle body; One end of the first arc-shaped cable holder is provided with a first fixed shaft for the first connection buckle or the second connection buckle to be rotated and clamped, and the other end is provided with a fixed buckle for buckling with the first tooth-shaped buckle or the second tooth-shaped buckle. The hook part of the fixed buckle adopts a downwardly inclined inner hook structure.

When the fixed base is connected to the fixed cable buckle, the inner side of the first arc-shaped cable holder and the inner side of the first arc-shaped buckle body form a binding space; Buckle the first connection buckle to the first fixed shaft, the semicircular buckle can be rotated along the first fixed shaft, so that one end of the first arc-shaped buckle body is hinged with the first arc-shaped cable holder, which is convenient to adjust the buckle position of the first tooth-shaped buckle and the fixed buckle; When it is necessary to release the buckle state of the first tooth-shaped buckle and the fixed buckle, use the ejector rod (or other tools) to push into the arc surface and push inward. At this time, the first tooth-shaped buckle can moves inward, and the first tooth buckle is separated from the fixed buckle.

When the fixed base is connected to the movable cable buckle, the inner side of the first arc-shaped cable holder and the inner side of the second arc-shaped buckle body form a binding space; bind the second connection buckle to the first fixed shaft to realize that one end of the second arc-shaped buckle body is hinged with the first arc-shaped cable holder, which is convenient to adjust the buckle position of the second tooth-shaped buckle and the fixed buckle; when need to release the binding state of the second tooth-shaped buckle and the fixed buckle, press down to unlock the pressing part, and the shielded sheet will move in the direction of the second arc-shaped buckle body. At this time, the second tooth-shaped buckle will move away from the fixed buckle, thus making the second tooth-shaped the buckle is separated from the fixed buckle.

Further, the movable base comprising a second base plate, the second base plate is provided with a second arc-shaped cable holder and an elastic buckling column in sequence. One end of the second arc-shaped cable holder is provided with a second fixed shaft for the first connection buckle or the second connection buckle to be rotated and clamped, and the other end is provided with a notch.

One side of the elastic buckling column is provided with a buckling part that can be buckled to the first tooth-shaped buckle or the second tooth-shaped buckle, the other side is provided with a pick for releasing the buckling state of the buckling part with the first tooth-shaped buckle or the second tooth-shaped buckle; the hook part of the buckling part adopts a downwardly inclined inner hook structure.

When the movable base is connected to the fixed cable buckle, the inner side of the second arc-shaped cable holder and the inner side of the first arc-shaped buckle body form a binding space; Bind the first connecting buckle to the second fixed shaft, the semicircular buckle can be rotated along the second fixed shaft to realize the articulation of one end of the first arc buckle body with the second arc cable holder, and then the buckling part of the elastic buckle column is connected to the first tooth-shaped buckle of other end of the first arc shaped buckle body to realizes the locking of the binding space;

When it is necessary to release the buckling state of the first tooth-shaped buckle and the buckling part, just need to pull the pick outwards, and the elastic buckle column will deform accordingly, and drive the buckle part away from the first tooth-shaped buckle, and then realize the separation of the first tooth buckle from the buckle part.

When the movable base is connected to the movable cable buckle, the inner side of the second arc-shaped cable holder and the inner side of the second arc-shaped buckle body form a binding space; Bind the second connecting buckle to the second fixed shaft to realize the articulation of one end of the second arc-shaped buckle body and second arc-shaped cable holder, and then realizes the locking of the binding space by buckling the buckle part and second tooth-shaped buckle;

When it is necessary to release the buckled state teeth of the second tooth-shaped buckle and the buckling part, there are two ways: The first one is to press down to unlock the pressing part, and the shielded sheet will move in the direction of the second arc-shaped buckle body. At this time, the second tooth-shaped buckle moves away from the buckling part, and the second tooth-shaped buckle is separated from the buckling part; The second one is to pull the pick outwards, and the elastic buckle column will deform accordingly, and drive the buckling part away from the second tooth-shaped buckle, and then realize the separation of the second tooth buckle from the buckling part.

FIGURE

1—Fixed type cable buckle; 11—First arc-shaped buckle body; 12—First connecting buckle; 121—Buckle; 122—

Clamping portion; 13—First tooth-shaped buckle; 14—Limited protruding tooth; 15—Arc surface; 16—First toggle part; 17—Special-shaped return force hole; 2—Movable cable buckle; 21—Second arc-shaped buckle body; 23—Shielded sheet; 231—Second tooth-shaped buckle; 232—Second limited protruding tooth; 233—Unlocking pressing part; 24—Second toggle part; 3—Fixed type base; 31—First base plate; 32—First arc-shaped cable holder; 33—First fixed shaft; 34—Fixed buckle; 4—Movable type base; 41—Second base plate; 42—Second arc-shaped cable holder; 421—Second fixed shaft; 43—Elastic buckle column; 431—Buckling part; 432—Pick Concrete Implementation Method The following is a detailed description of the preferred embodiment of the invention in combination with the figures, so that the advantages and features of the invention can be more easily understood by technicians in this line, then to make a clearer definition of the protection scope of this invention.

Embodiment

As shown in FIG. 1-17, the reusable cable buckle assembly of the invention, comprising a detachable connection cable buckle and a base, a bundle space is provided between the cable buckle and base for bundle the cables; The cable buckle is a fixed type cable buckle 1 or a movable type cable buckle 2, and the base is a fixed type base 3 or a movable type base 4.

Through the detachable connection of the cable buckle and the base, the bundle space can be opened or closed, which is convenient for the rewiring or replacing of cables. The cable buckle and the base be repeat use, which can greatly reduce construction time and cost; The flexibility of cable buckle and base connection is improve by fixed or movable cable buckles and fixed or movable bases, and its application scope is expanded.

Figure 1:
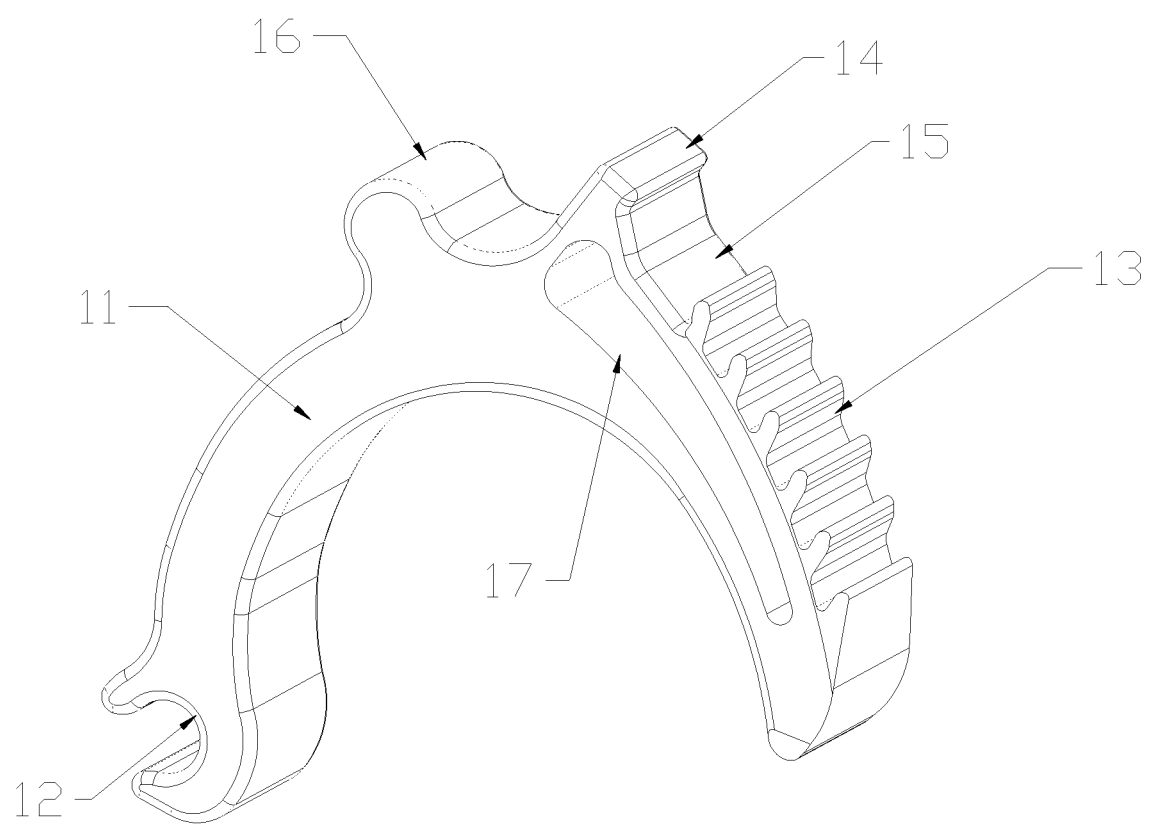
FIG. 1 is a solid structure schematic diagram of fixed type cable buckle in embodiment of the present invention.
Figure 2:
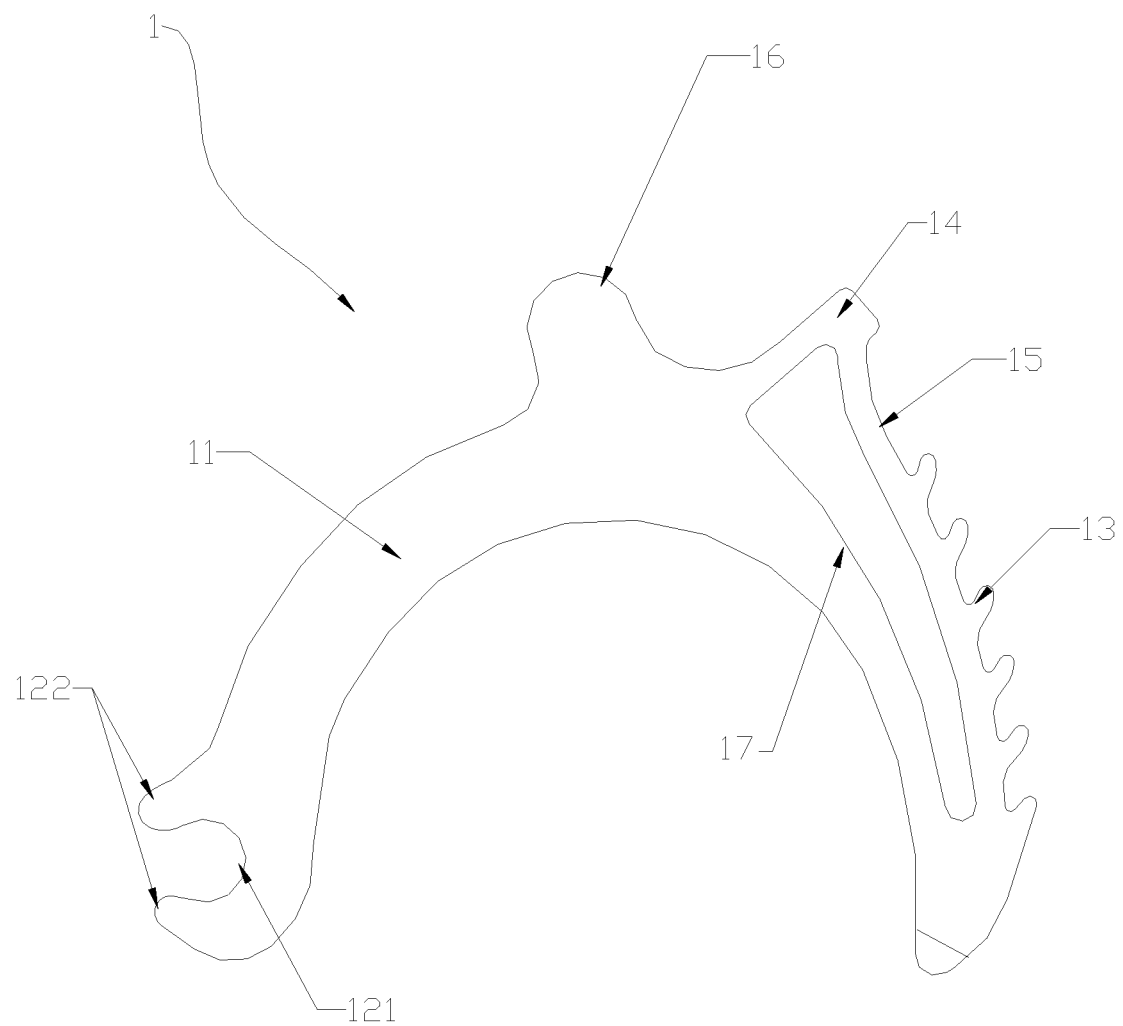
FIG. 2 is a structure schematic diagram of fixed type cable buckle in embodiment of the present invention.

In this embodiment, as shown in FIG. 1-2, the fixed type cable buckle 1 comprising the first arc-shaped buckle body 11, one end of the first arc-shaped buckle body 11 is provided with a first connecting buckle 12 that can rotate along the base, and the other end is provided with a side wall first tooth-shaped buckle 13 that can be fastened to the base.

The first tooth-shaped buckle 13 is provided with a first limited protruding teeth 14 close to one end of connecting buckle 12, an arc surface 15 is provided between the first limited protruding teeth 14 and tooth-shaped buckle 13.

The most tightly buckled position of the first tooth-shaped buckle 13 is defined by the setting of the first limited protruding teeth 14, and the setting of the arc surface 15 facilitates the separation of the first tooth-shaped buckle 13 and the base.

In this embodiment, the first connecting buckle 12 comprising a semicircular buckle 121, and both ends of the buckle extend outward to form a clamping portion 122. The rotation of the first connection buckle 12 is realized by the semicircular buckle 121, and the clamping portion 122 prevent the buckle 121 from slipping off the base during the rotation process.

The outer wall of the first arc-shaped buckle body 11 is also provided with the first toggle part 16 between the first limited protruding teeth 14 and the first connection buckle. The setting of toggle part 16 facilitates the adjustment of the buckling position of the first tooth-shaped buckle 13.

The first arc-shaped buckle body 11 is provided with special-shaped return force hole 17 along the length direction of the first tooth-shaped buckle 13, and the width of the special-shaped return force hole 17 gradually decreases from the direction closer to the arc surface 15 away from the arc surface 15.

In actual use, in the process of buckling the first tooth-shaped buckle 13 down to the base, as the first tooth-shaped buckle 13 is buckled down, the more resistance the first tooth-shaped buckle 13 is at the buckling position, the greater the buckling force required, and it is easy to disengage due to the reaction force after buckling, resulting in a change of buckling position. Therefore, the setting of the special-shaped return force hole 17 can use the elastic force of the plastic material to provide a certain squeezing space for the buckle of the first tooth-shaped buckle 13, reduce the buckling force required when the first tooth-shaped buckle 13 is buckled down, and it also avoids the disengage phenomenon of the first tooth-shaped buckle 13 after buckling.

Figure 3:
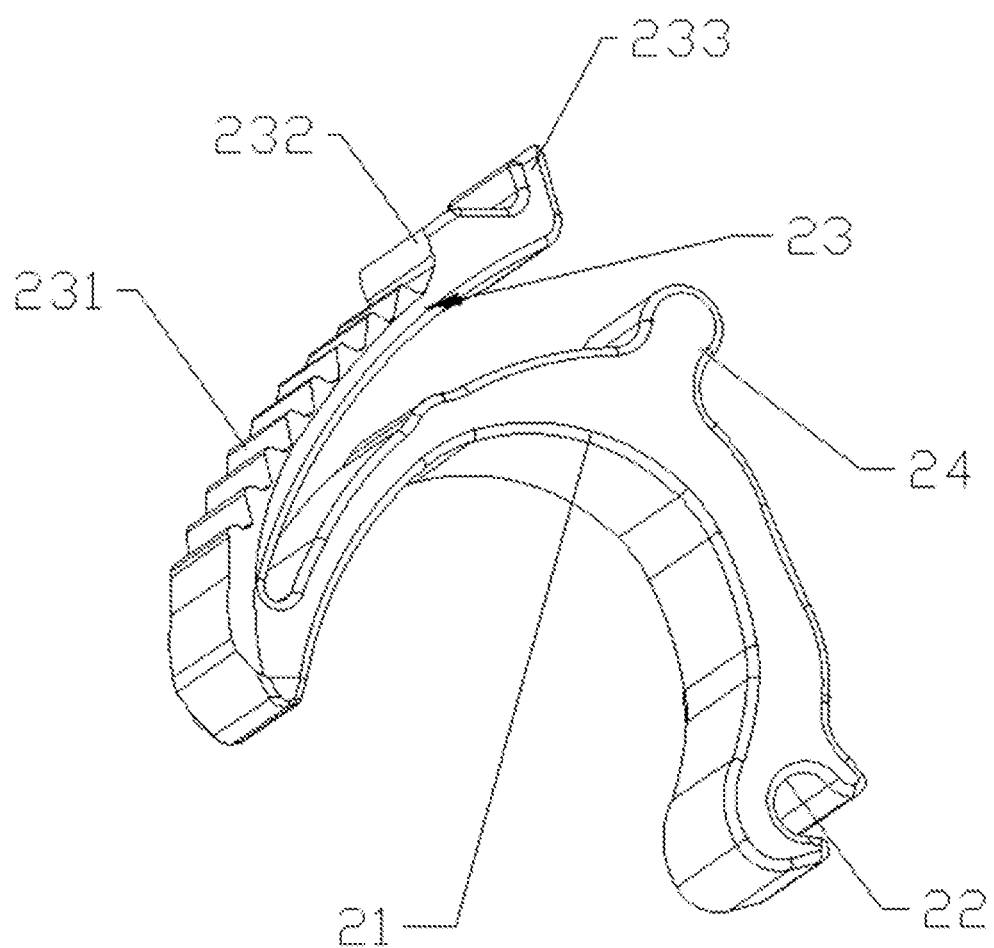
FIG. 3 is a structure schematic diagram of movable type cable buckle in embodiment of the present invention.
Figure 4:
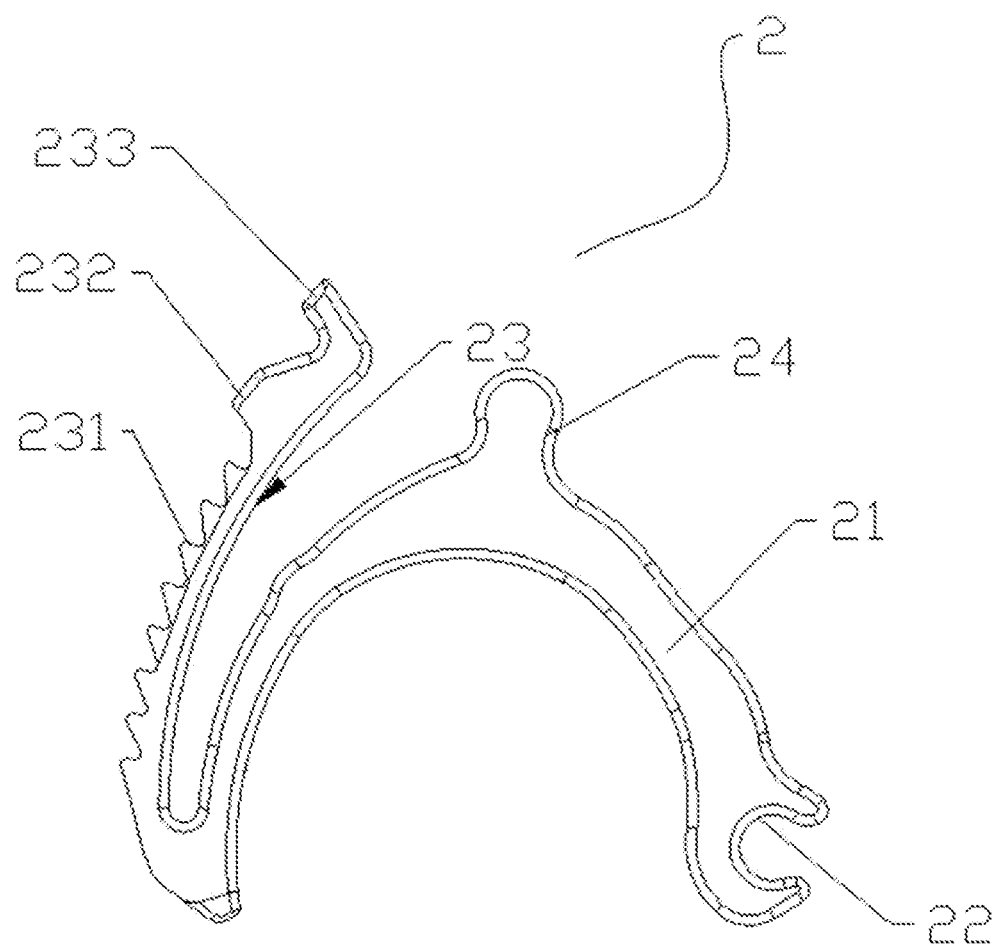
FIG. 4 is a structure schematic diagram of movable type cable buckle in embodiment of the present invention.

In this embodiment, as shown in FIG. 3-4, the movable cable buckle 2 comprising the second arc-shaped buckle body 21. One end of the second arc-shaped buckle body 21 is provided with a second connecting buckle 22 that can rotate along the base, and the other end is provided with an integrally connected with a bending structure shielded sheet 23. The structure of second connecting buckle 22 and first connecting buckle 12 is same. The outer side wall of the shielded sheet 23 is provided with a second tooth-shaped buckle 231 that can be fastened to the base. The end of the second tooth-shaped buckle 231 away from the second arc-shaped buckle body 21 is sequentially provided with the second limited protruding tooth 232 and an unlocking pressing part 233, which is used to separate the second tooth-shaped buckle 231 from the base; The side wall of the second arc-shaped buckle body 21 is also provided with a second toggle part 24 which is convenient for adjusting the position of the second tooth-shaped buckle 231 and the base.

Figure 5:
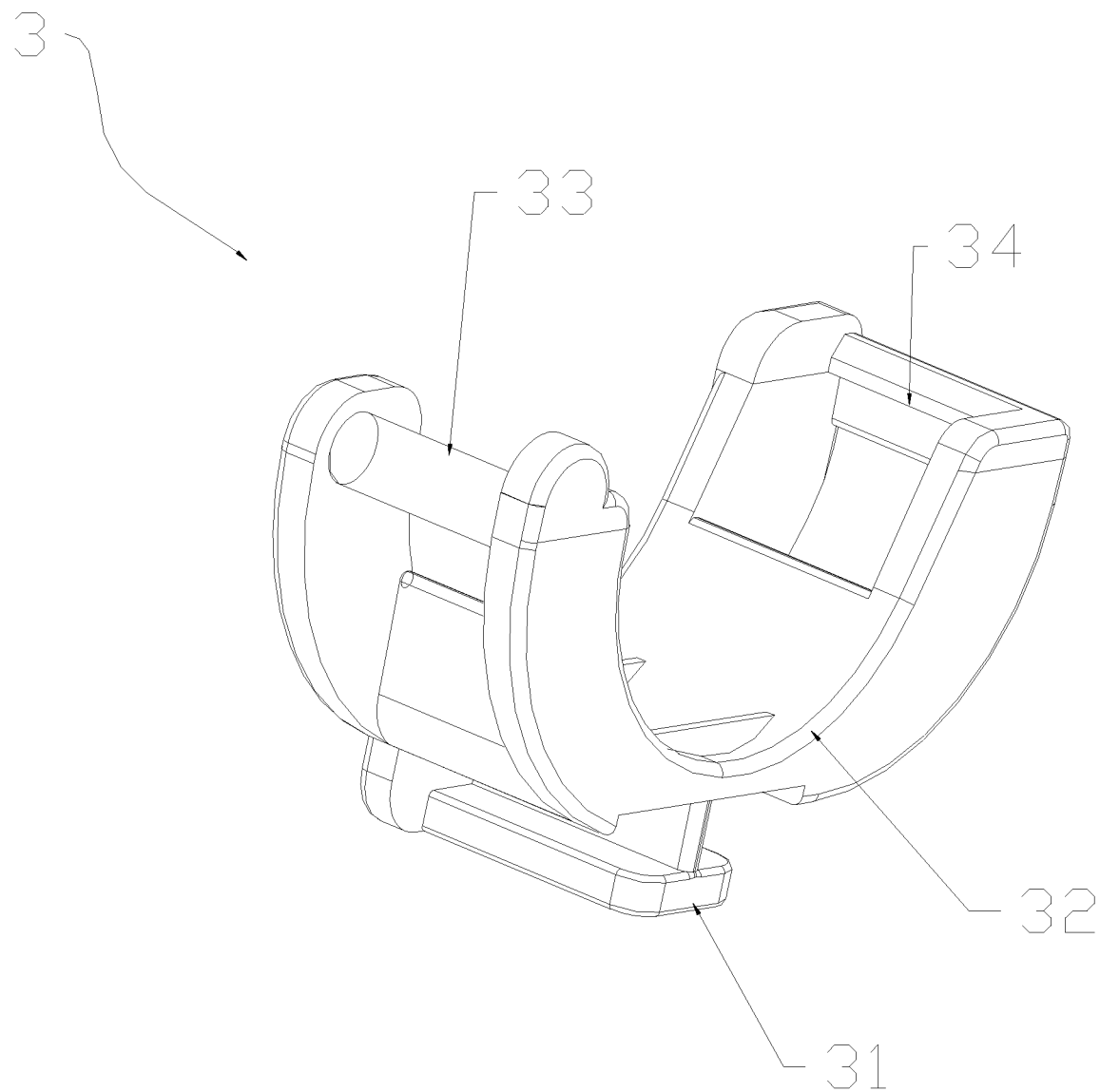
FIG. 5 is the solid structure schematic diagram of fixed type base in embodiment of the present invention.

In this embodiment, as shown in FIG. 5, the fixed type base 3 comprising the first base plate 31, and the first base plate 31 is provided with the first arc-shaped cable holder 32 matching the first arc-shaped buckle body 11 or the second arc-shaped buckle body 21; One end of the first arc-shaped cable holder 32 is provided with the first fixed shaft 33 for the first connection buckle 12 or the second connection buckle 22 to be rotated and clamped, and the other end is provided with a fixed buckle 34 for buckling with the first tooth-shaped buckle 13 or the second tooth-shaped buckle 231. The hook part of the fixed buckle adopts a downwardly inclined inner hook structure, then the reverse hook buckle formed by the hook part of the fixed buckle 34 and the first tooth-shaped buckle 13 or the second tooth-shaped buckle 231 makes the buckling tighter.

Figure 6:
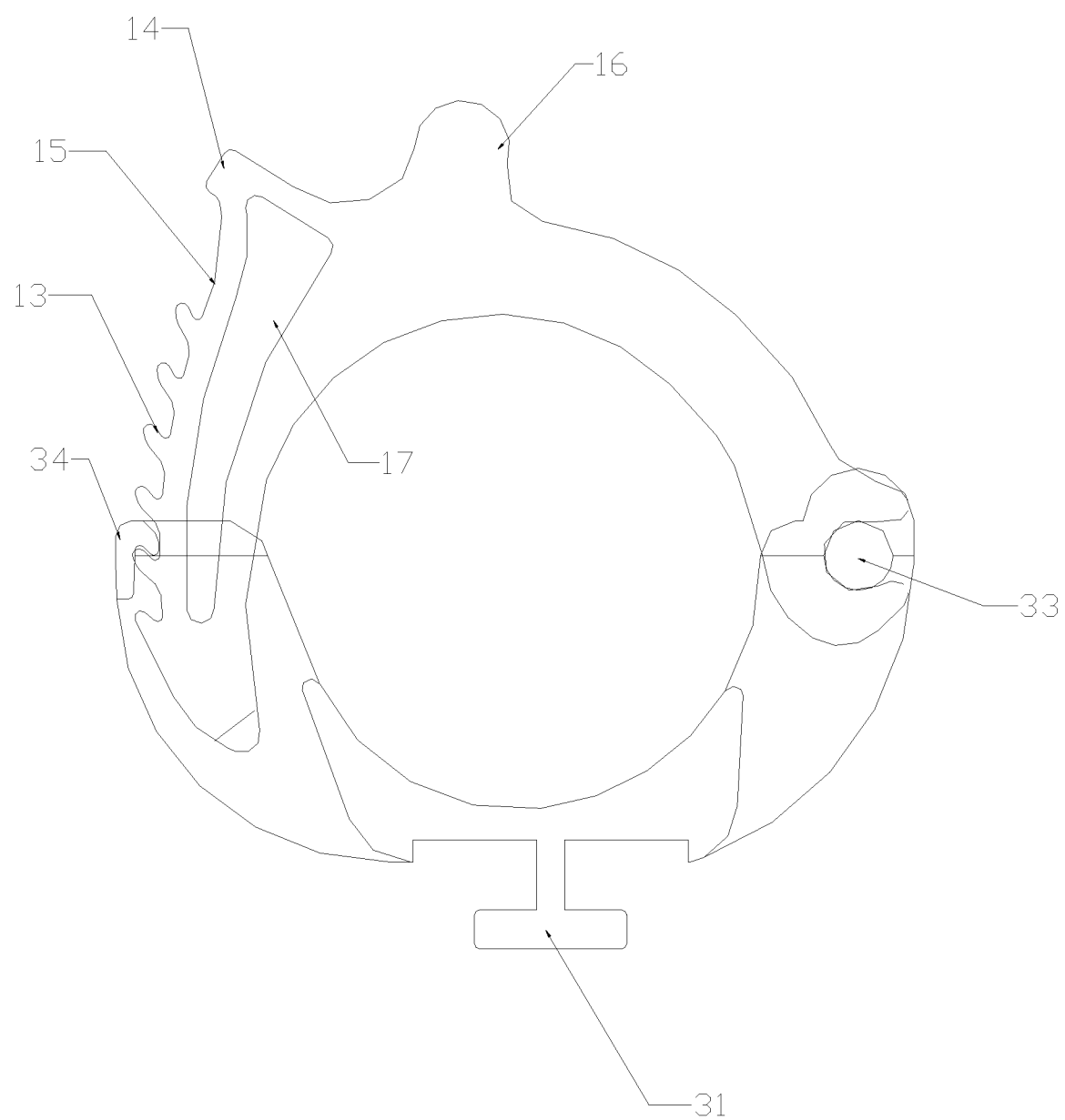
FIG. 6 is the assembly diagram of fixed type base and fixed type cable buckle in embodiment of the present invention.

As shown in FIG. 6, 11, 12, when the fixed base 3 is connected to the fixed cable buckle 1, the inner side of the first arc-shaped cable holder 32 and the inner side of the first arc-shaped buckle body 11 form a binding space; Bind the first connecting buckle 12 to the first fixed shaft 33, the semicircular buckle 121 can be rotated along the first fixed shaft 33 to realize the articulation of one end of the first arc-shaped buckle body 11 with the first arc cable holder, which is convenient for adjusting the buckling position of the first tooth-shaped buckle 13 and the fixed buckle 34;

when it is necessary to release the buckling state of the first tooth-shaped buckle 13 and the fixed buckle 34, press the ejector rod (or other tools) to push into the arc surface and push inward. At this time, the first tooth buckle 13 can move inward accordingly, then the first tooth buckle 13 is separated from the fixed buckle 34.

Figure 7:
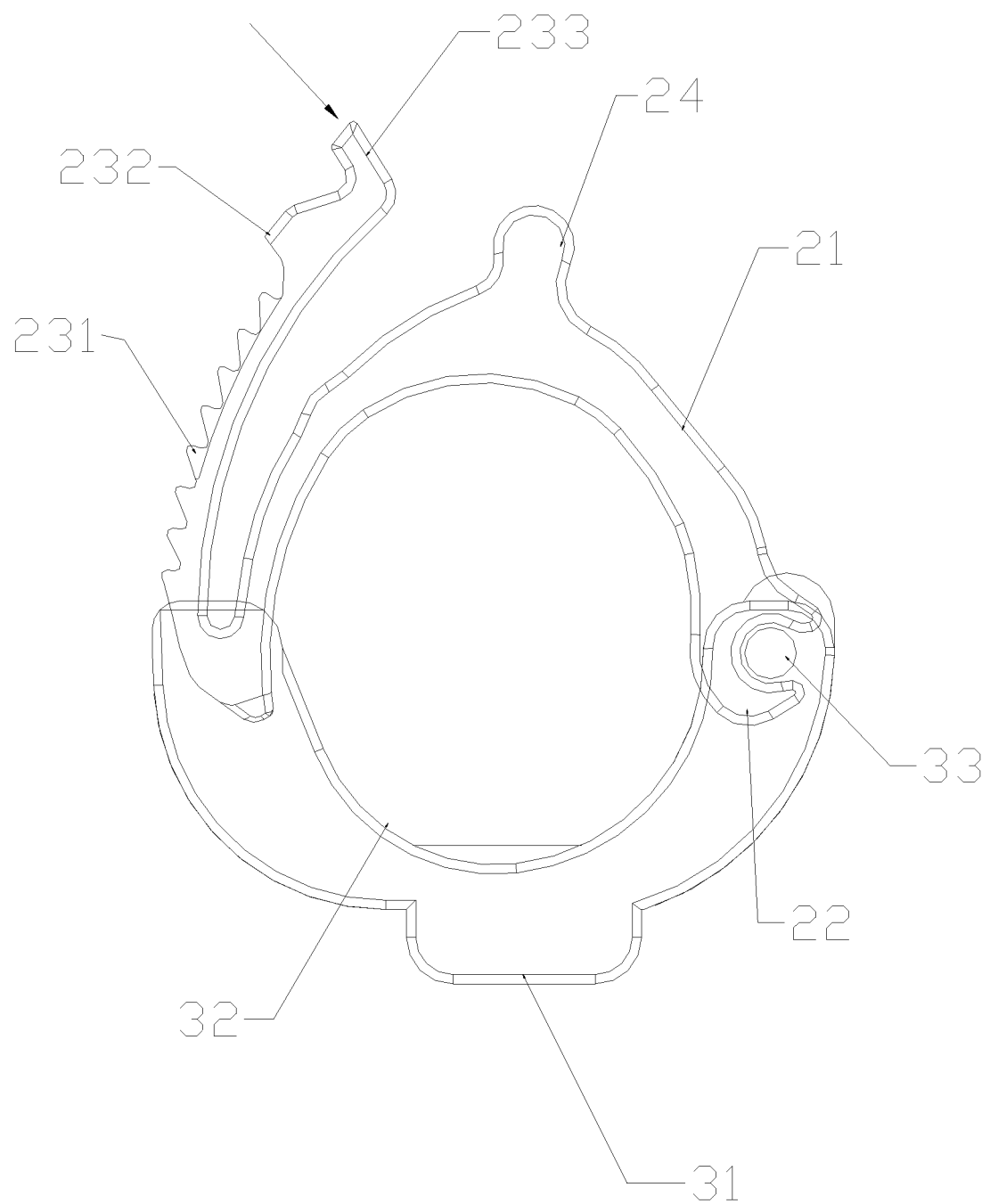
FIG. 7 is the assembly diagram of fixed type base and movable type cable buckle in embodiment of the present invention.

As shown in FIG. 7, 13, 14, when the movable base 3 is connected to the movable cable buckle 2, the inner side of the first arc-shaped cable holder 32 and the inner side of the second arc-shaped buckle body 21 form a binding space; Bind the second connecting buckle 21 to the first fixed shaft 33 to realize the articulation of one end of the second arc-shaped buckle body 21 with the first arc-shaped cable holder 32, which is convenient for adjusting the buckling position of the second tooth-shaped buckle 231 and the fixed buckle 34;

when it is necessary to release the buckling state of the second tooth-shaped buckle 231 and the fixed buckle 34, press down the unlocking pressing part 233, the shielded sheet is move along the direction of second arc-shaped buckle body 21, at this time, the second tooth-shaped buckle 231 is move away from the direction of fixed buckle 34, then the second tooth-shaped buckle 231 is separated from the fixed buckle 34.

Figure 8:
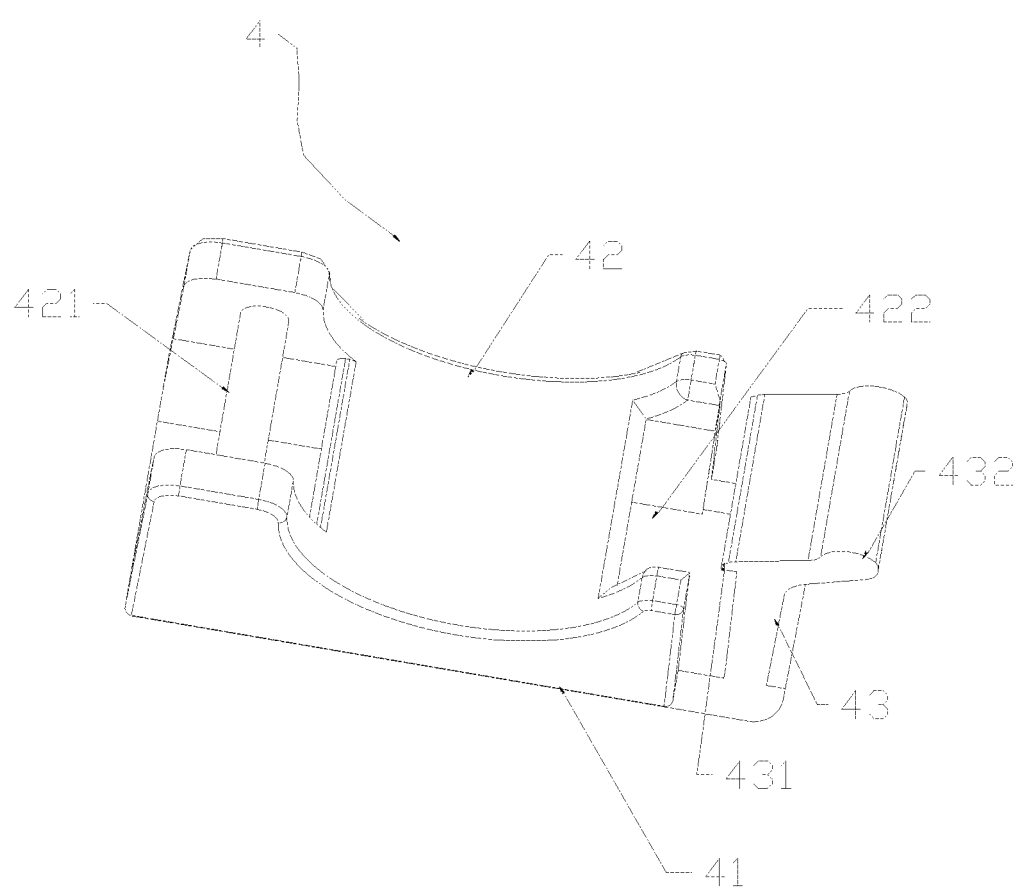
FIG. 8 is a structure schematic diagram of movable type base in embodiment of the present invention.

In this embodiment, as shown in FIG. 8, the movable base 4 comprising a second base plate 41, the second base plate 41 is provided with a second arc-shaped cable holder 42 and an elastic buckling column 43 in sequence. One end of the second arc-shaped cable holder 42 is provided with a second fixed shaft 421 for the first connection buckle 12 or the second connection buckle 22 to be rotated and clamped, and the other end is provided with a notch.

One side of the elastic buckling column 43 is provided with a buckling part 431 that can be buckled to the first tooth-shaped buckle 13 or the second tooth-shaped buckle 231, the other side is provided with a pick 432 for releasing the buckling state of the buckling part 431 with the first tooth-shaped buckle 13 or the second tooth-shaped buckle 231; the hook part of the buckling part 431 adopts a downwardly inclined inner hook structure, then the reverse hook buckle formed by the hook part of buckle part 431 and the first tooth-shaped buckle 13 or the second tooth-shaped buckle 231 makes the buckling tighter.

Figure 9:
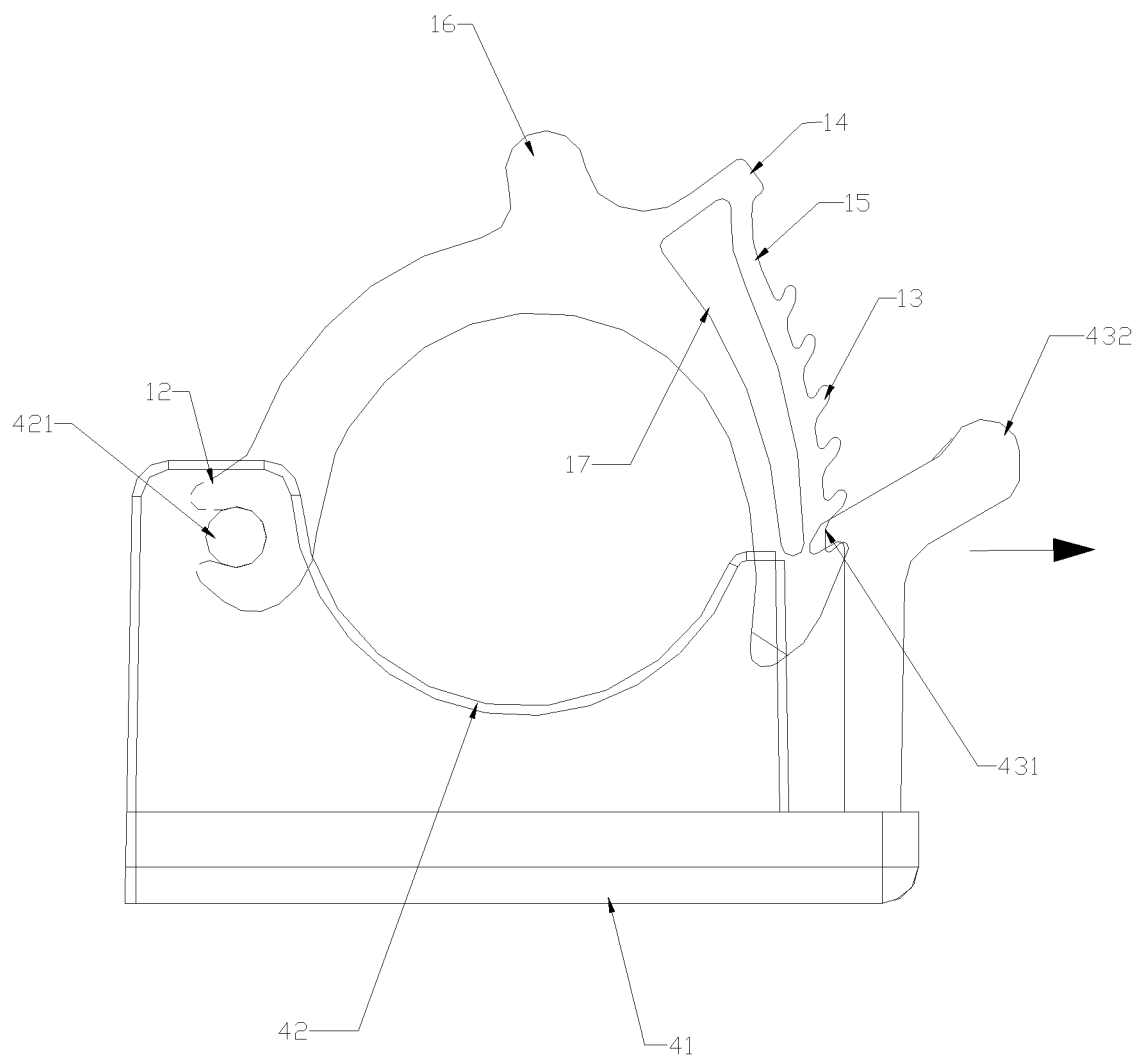
FIG. 9 is the assembly diagram of movable type base and fixed type cable buckle in embodiment of the present invention.

As shown in FIG. 9, 15, when the movable type base 4 is connected to the fixed type cable buckle 1, the inner side of the second arc-shaped cable holder 42 and the inner side of the first arc-shaped buckle body 11 form a binding space; Bind the first connecting buckle 12 to the second fixed shaft 421, the semicircular buckle 121 can be rotated along the second fixed shaft 421 to realize the articulation of one end of the first arc buckle body 11 with the second arc cable holder 42, and then the buckling part of the elastic buckle column 43 is connected to the first tooth-shaped buckle 13 of other end of the first arc shaped buckle body 11 to realizes the locking of the binding space;

When it is necessary to release the buckling state of the first tooth-shaped buckle 13 and the buckling part 431, just need to pull the pick 432 outwards, and the elastic buckle column 43 will deform accordingly, and drive the buckle part 431 away from the first tooth-shaped buckle 13, and then realize the separation of the first tooth buckle 13 from the buckle part 431.

Figure 10:
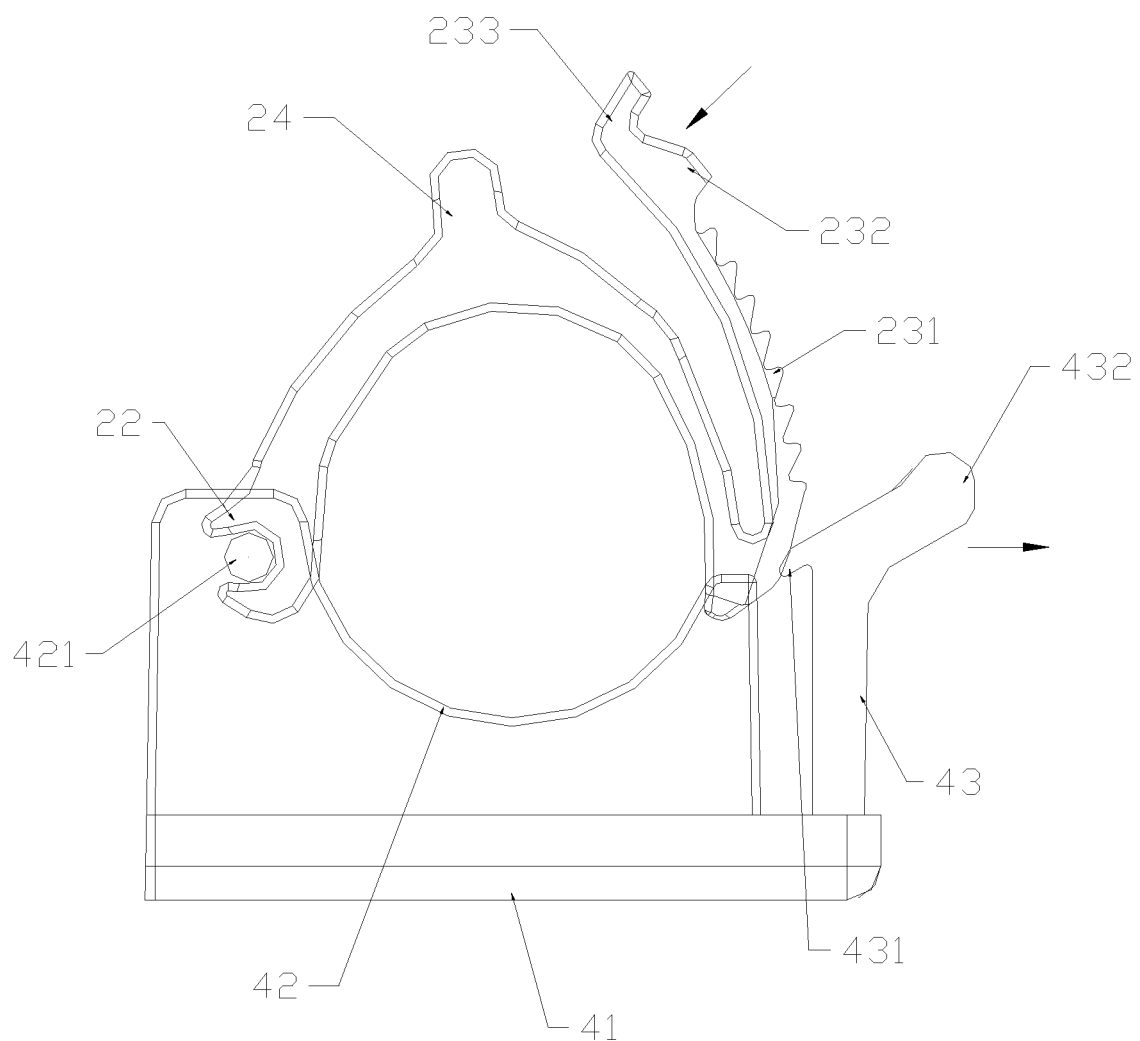
FIG. 10 is the assembly diagram of movable type base and movable type cable buckle of the present invention.
Figure 11:
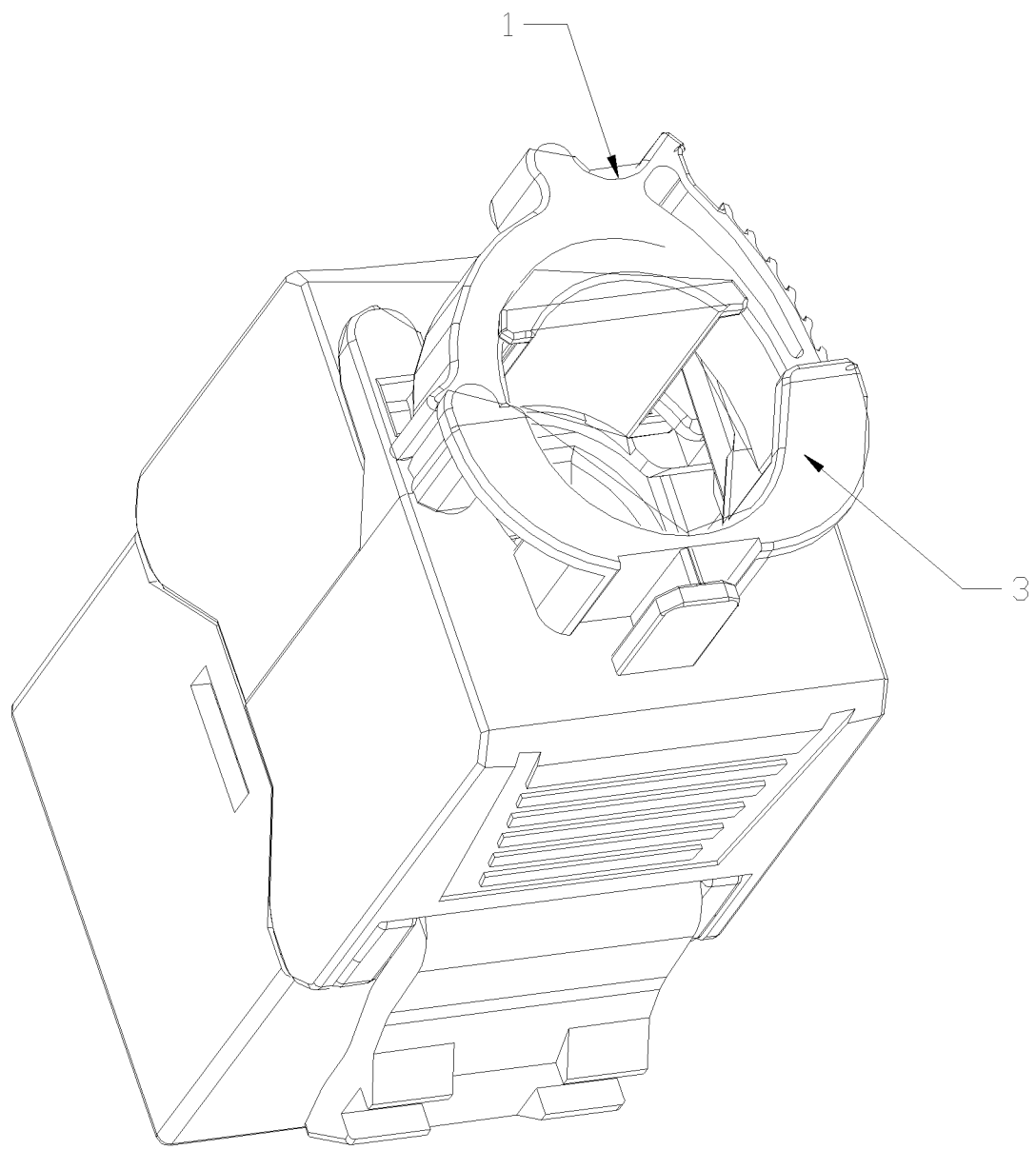
FIG. 11 is the schematic diagram of the assembly of the fixed type base and the fixed type cable buckle in network module with 180 degrees wiring in embodiment of the present invention.
Figure 12:
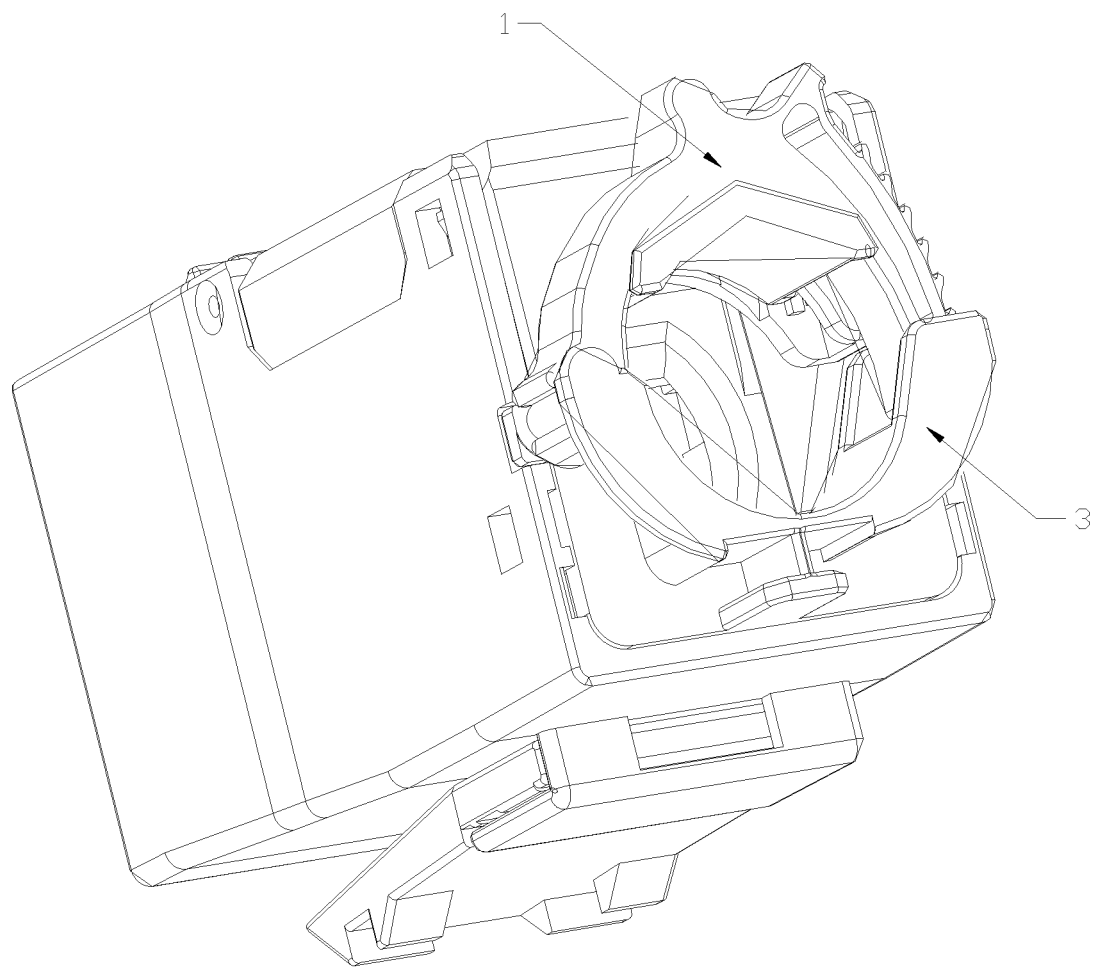
FIG. 12 is the schematic diagram of the assembly of the fixed type base and the fixed type cable buckle in network module with 90 degrees wiring in embodiment of the present invention.
Figure 13:
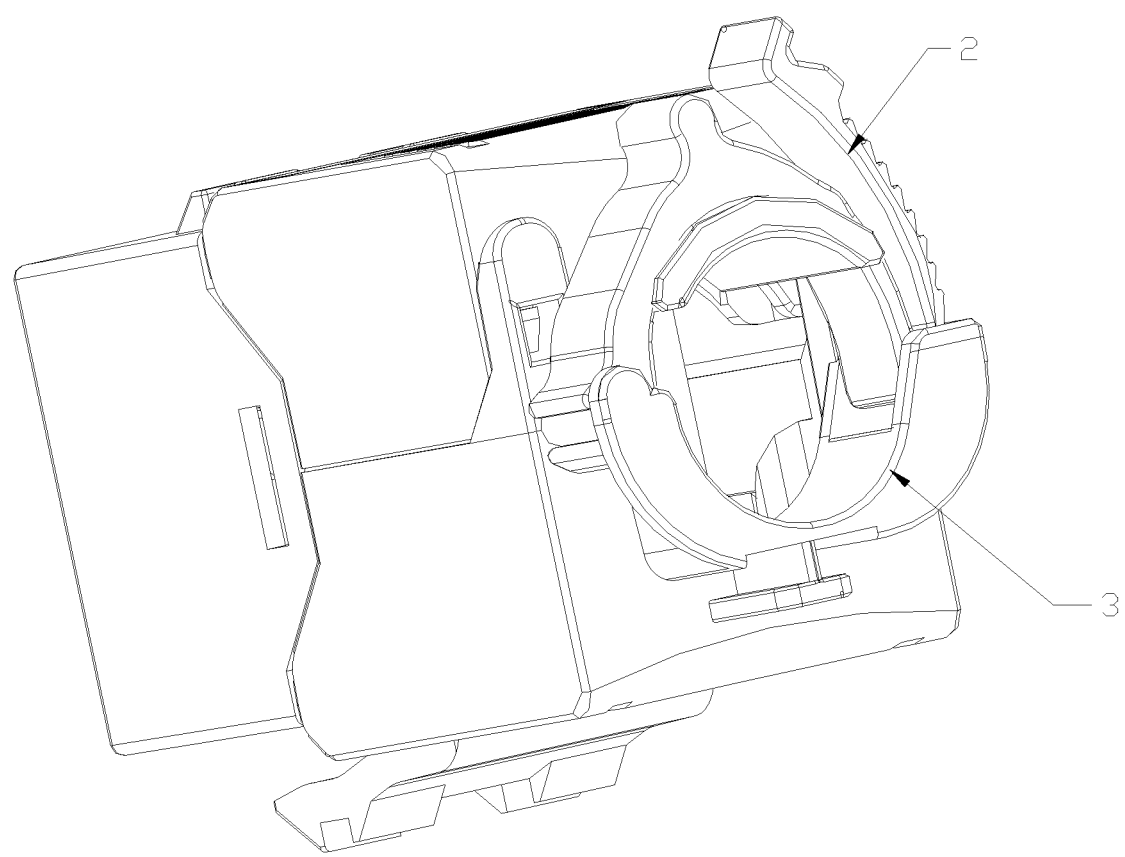
FIG. 13 is the schematic diagram of the assembly of the fixed type base and the movable type cable buckle in network module with 180 degrees wiring in embodiment of the present invention.
Figure 14:
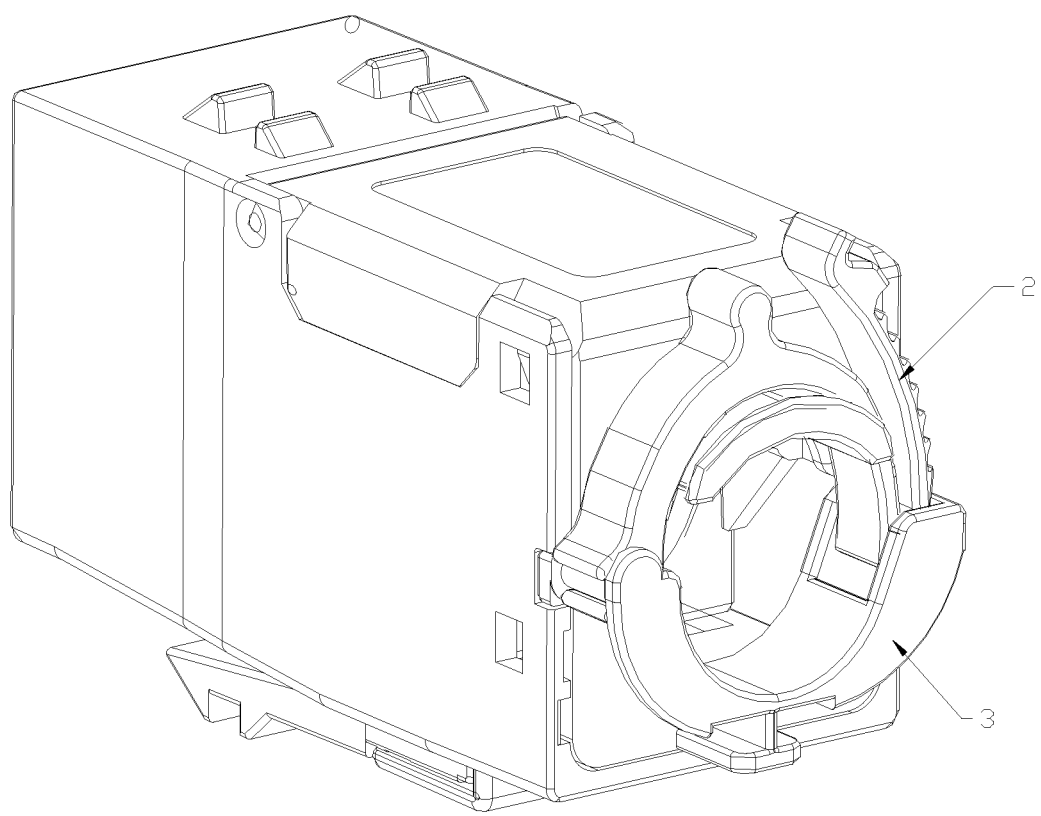
FIG. 14 is the schematic diagram of the assembly of the fixed type base and the movable type cable buckle in network module with 90 degrees wiring in embodiment of the present invention.

As shown in FIG. 10, 16, when the movable base is connected to the movable cable buckle, the inner side of the second arc-shaped cable holder and the inner side of the second arc-shaped buckle body form a binding space; Bind the second connecting buckle 22 to the second fixed shaft 421 to realize the articulation of one end of the second arc-shaped buckle body 21 and second arc-shaped buckle holder 42, and then realizes the locking of the binding space by buckling the buckle part 431 and second tooth-shaped buckle 231;

When it is necessary to release the buckled state teeth of the second tooth-shaped buckle 231 and the buckling part 431, there are two ways: The first one is to press down to unlock the pressing part 233, and the shielded sheet 23 will move in the direction of the second arc-shaped buckle body 21. At this time, the second tooth-shaped buckle 231 moves away from the buckling part 431, and the second tooth-shaped buckle 231 is separated from the buckling part 431; The second one is to pull the pick 432 outwards, and the elastic buckle column 43 will deform accordingly, and drive the buckling part 431 away from the second tooth-shaped buckle 231, and then realize the separation of the second tooth buckle 231 from the buckling part 431.

Figure 15:
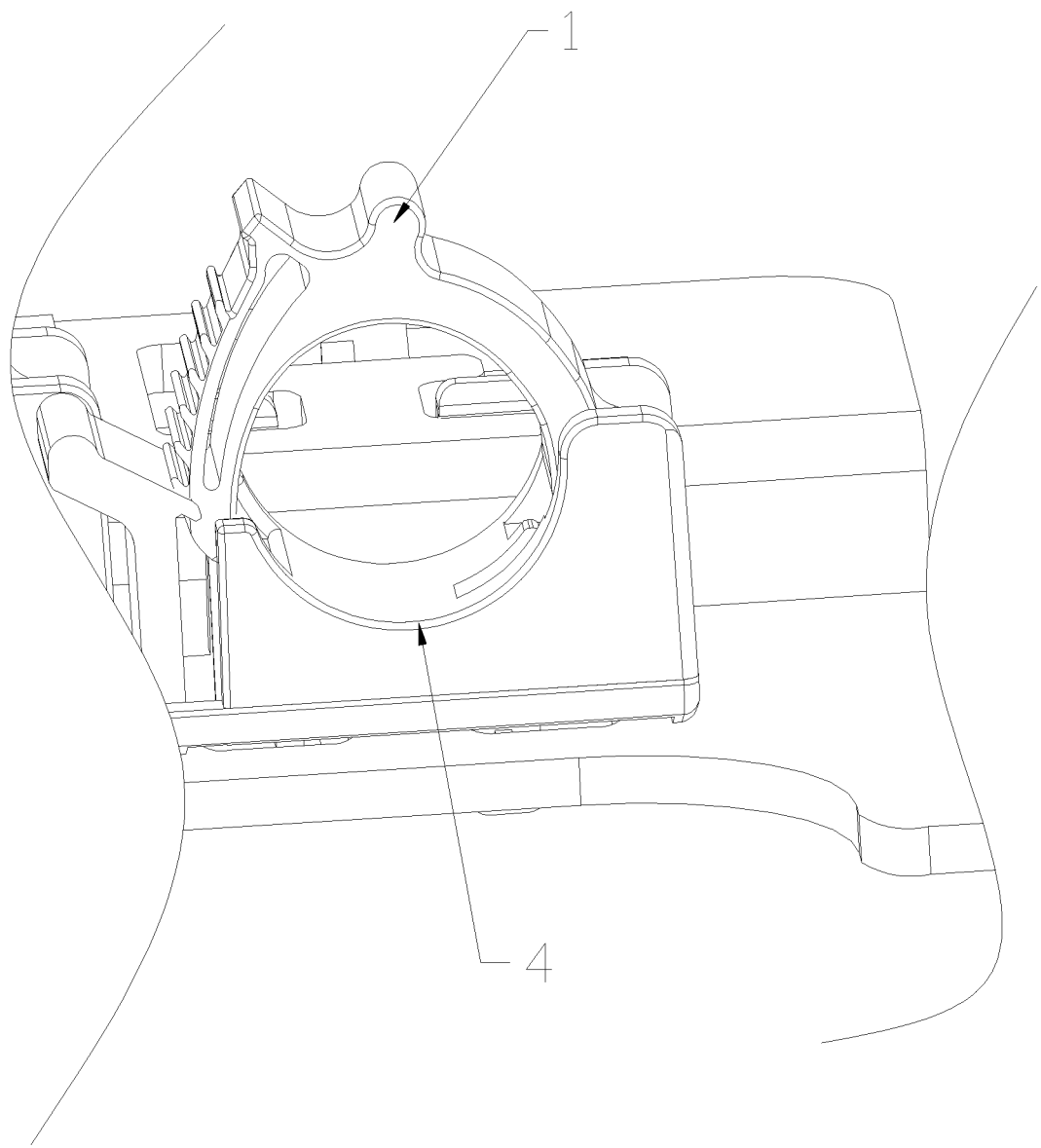
FIG. 15 is the schematic diagram of the assembly of the movable type base and the fixed type cable buckle in patch panel with network module in embodiment of the present invention.
Figure 16:
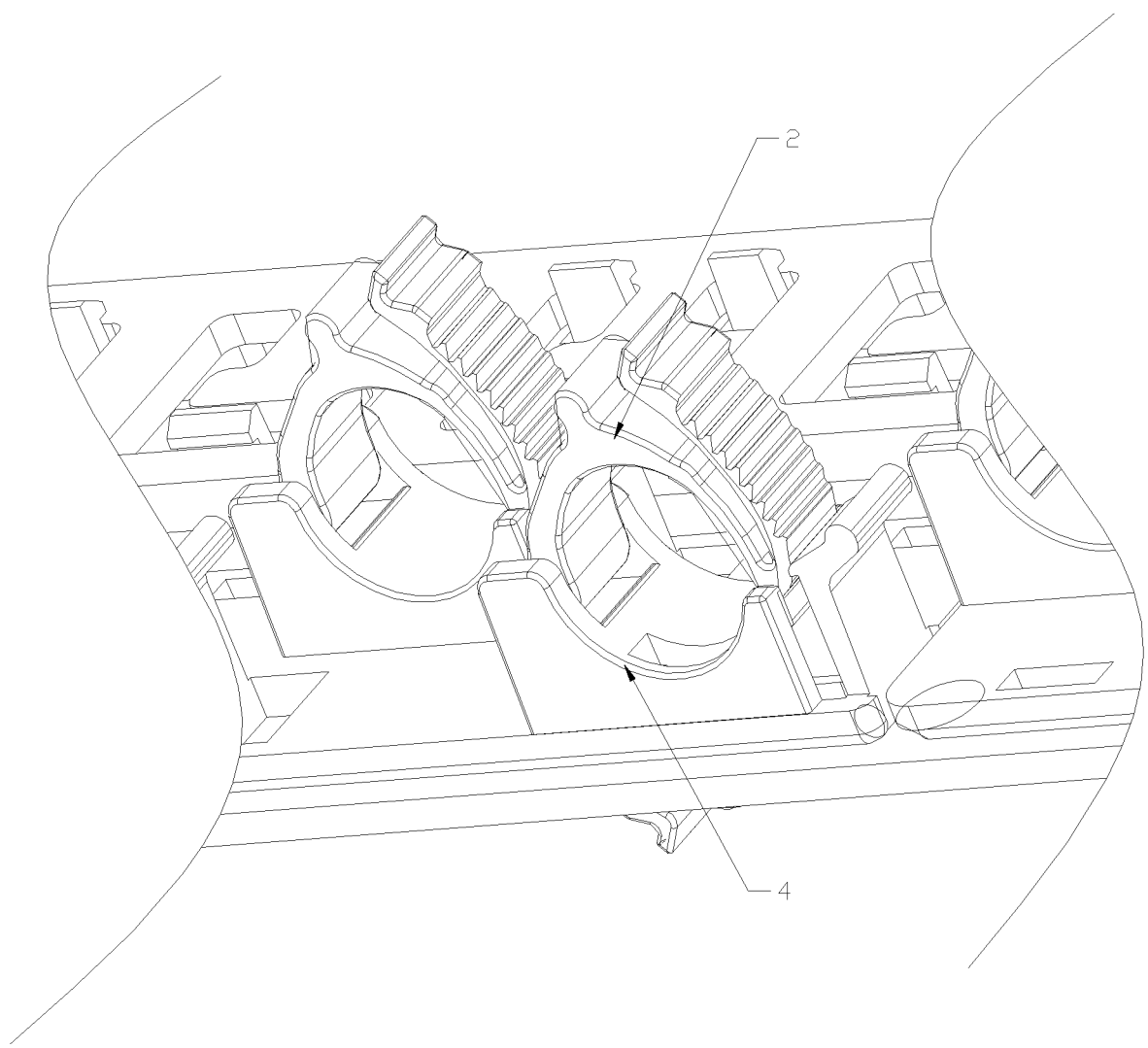
FIG. 16 is the schematic diagram of the assembly of the movable type base and the movable type cable buckle in patch panel with network module in embodiment of the present invention.
Figure 17:
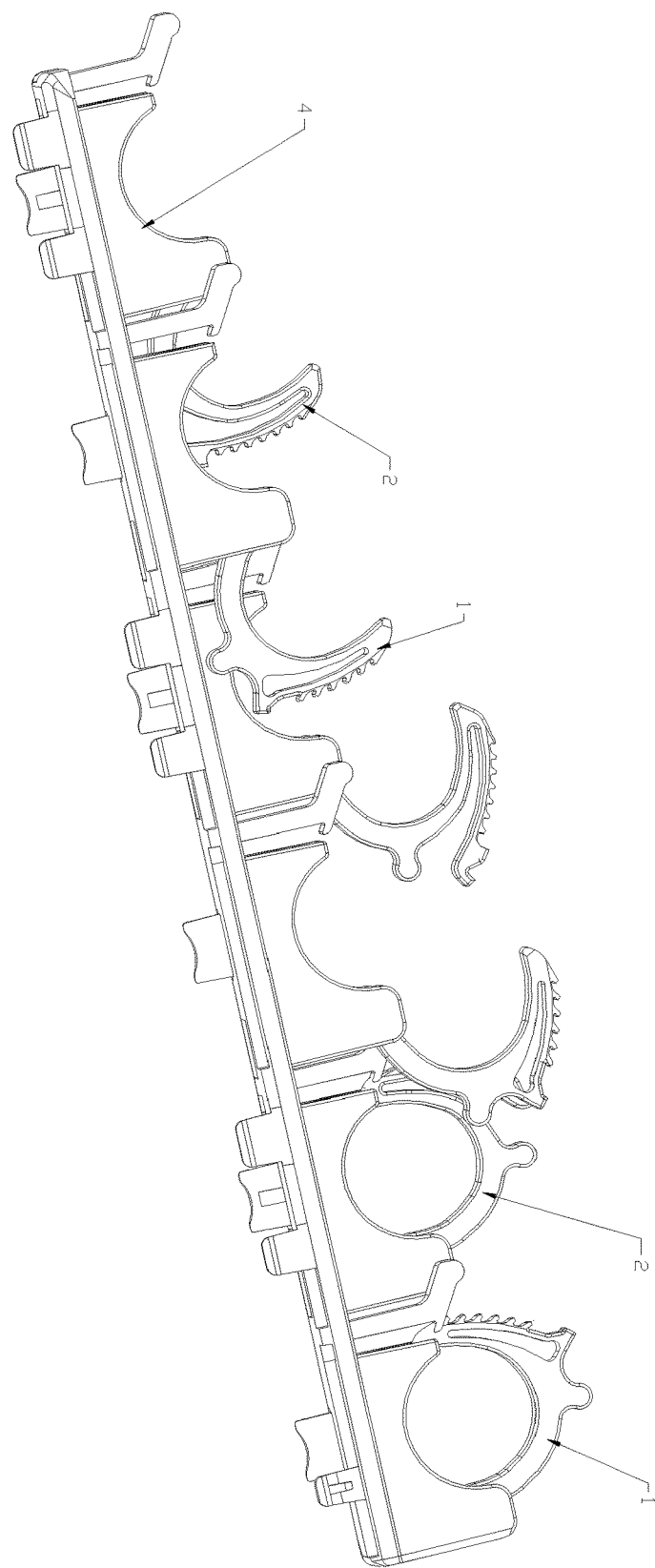
FIG. 17 is the schematic diagram of the opening and buckling state of the movable type base and the movable type cable buckle and fixed type cable buckle in patch panel with network module in embodiment of the present invention.

As shown in FIG. 15-17, when the cable buckle assembly is used in a network patch panel with network module, the cable buckle assembly is staggered back and forth, which preferably increases the space between the cable buckle assembly and the cable buckle assembly, and makes cable management simply and neat.

The above implementation mode is only to illustrate the technical conception and characteristics of the invention, and its purpose is to let people familiar with the technology understand the content of the invention and implement it, and can not limit the protection scope of the invention. All equivalent changes or modifications made according to the spiritual essence of the invention shall be covered in the protection scope of the invention.

The invention claimed is:

1. A reusable cable buckle assembly, comprising a detachable connection cable buckle and a base, a bundle space is provided between a cable tie and base for bundle the cables; the cable buckle is a fixed type cable buckle or a movable type cable buckle, and the base is a fixed type base or a movable type base;

wherein the fixed type cable buckle comprises a first arc-shaped buckle body, one end of the first arc-shaped buckle body is provided with a first connecting buckle that can rotate along the base, and the other end of the first arc-shaped buckle body is provided with a side wall of a first tooth-shaped buckle that can be fastened to the base;

wherein the first arc-shaped buckle body is provided with a special-shaped return force hole along the length direction of the first tooth-shaped buckle.

2. The cable buckle assembly according to claim 1, wherein the first tooth-shaped buckle is provided with a first limited protruding tooth close to one end of the connecting buckle, an arc surface is provided between the first limited protruding tooth and tooth-shaped buckle.

3. The cable buckle assembly according to claim 2, wherein the width of the special-shaped return force hole gradually decreases from the direction closer to the arc surface away from the arc surface.

4. The cable buckle assembly according to claim 2, wherein the first connecting buckle comprises a semicircular buckle, and both ends of the semicircular buckle extend outward to form a clamping portion.

5. The cable buckle assembly according to claim 2, wherein a side wall of the first arc-shaped buckle body is provided with a toggle part between the first limited protruding tooth and the first connecting buckle.

6. The cable buckle assembly according to claim 1, wherein the fixed base comprising a first base plate, and the first base plate is provided with a first arc-shaped cable holder matching the first arc-shaped buckle body or a second arc-shaped buckle body; one end of the first arc-shaped cable holder is provided with a first fixed shaft for the first connecting buckle or a second connecting buckle to be rotated and clamped, and the other end of the first arc-shaped cable holder is provided with a fixed buckle for buckling with the first tooth-shaped buckle or a second tooth-shaped buckle, and a hook part of the fixed buckle adopts a downwardly inclined inner hook structure.

7. The cable buckle assembly according to claim 1, wherein the movable base comprising a second base plate, the second base plate is provided with a second arc-shaped cable holder and an elastic buckling column in sequence; one end of the second arc-shaped cable holder is provided with a second fixed shaft for a first connection buckle or a second connection buckle to be rotated and clamped, and the other end of the second arc-shaped cable holder is provided with a notch, one side of the elastic buckling column is provided with a buckling part that can be buckled to the first tooth-shaped buckle or the second tooth-shaped buckle, the other side of the elastic buckling column is provided with a pick for releasing a buckling state of the buckling part with the first tooth-shaped buckle or the second tooth-shaped buckle; a hook part of the buckling part adopts a downwardly inclined inner hook structure.

8. A reusable cable buckle assembly, comprising a detachable connection cable buckle and a base, a bundle space is provided between a cable tie and base for bundle the cables; the cable buckle is a fixed type cable buckle or a movable type cable buckle, and the base is a fixed type base or a movable type base;

wherein the movable cable buckle includes a second arc-shaped buckle body; one end of the second arc-shaped buckle body is provided with a second connecting buckle that can rotate along the base, and the other end of the second arc-shaped buckled body is integrally connected with a bending structure shielded sheet; an outer side wall of the shielded sheet is provided with a second tooth-shaped buckle that can be fastened to the base.

9. The cable buckle assembly according to claim 8, wherein an end of the second tooth-shaped buckle away from the second arc-shaped buckle body is sequentially provided with a second limited protruding tooth and an unlocking pressing part, which is used to separate the second tooth-shaped buckle from the base;

a side wall of the second arc-shaped buckle body is also provided with a second toggle part which is convenient for adjusting the position of the second tooth-shaped buckle and the base.

10. The cable buckle assembly according to claim 8, wherein the fixed base comprising a first base plate, and the first base plate is provided with a first arc-shaped cable holder matching a first arc-shaped buckle body or the second arc-shaped buckle body; one end of the first arc-shaped cable holder is provided with a first fixed shaft for a first connection buckle or a second connection buckle to be rotated and clamped, and the other end of the first arc-shaped cable holder is provided with a fixed buckle for buckling with a first tooth-shaped buckle or the second tooth-shaped buckle, a hook part of the fixed buckle adopts a downwardly inclined inner hook structure.

11. The cable buckle assembly according to claim 8, wherein the movable base comprising a second base plate, the second base plate is provided with a second arc-shaped cable holder and an elastic buckling column in sequence; one end of the second arc-shaped cable holder is provided with a second fixed shaft for a first connection buckle or a second connection buckle to be rotated and clamped, and the other end of the second arc-shaped cable holder is provided with a notch, one side of the elastic buckling column is provided with a buckling part that can be buckled to a first tooth-shaped buckle or the second tooth-shaped buckle, the other side of the elastic buckling column is provided with a pick for releasing a buckling state of the buckling part with the first tooth-shaped buckle or the second tooth-shaped buckle; the hook part of the buckling part adopts a downwardly inclined inner hook structure.

\* \* \* \* \*